United States Patent
Han et al.

(10) Patent No.: US 8,468,954 B2
(45) Date of Patent: Jun. 25, 2013

(54) SIDE WALL AND BOXCAR OF RAILWAY WAGON

(75) Inventors: Junfeng Han, Heilongjiang (CN);
Yongji Zhao, Heilongjiang (CN);
Yuebin Yu, Heilongjiang (CN); Haipeng Liu, Heilongjiang (CN); Xin Zhang, Heilongjiang (CN)

(73) Assignees: Qiqihar Railway Rolling Stock Co., Ltd., Heilongjiang (CN); Dalian Qiche Railway Rolling Stock Co., Ltd., Liaoning (CN)

( * ) Notice: Subject to any disclaimer, the term of this patent is extended or adjusted under 35 U.S.C. 154(b) by 93 days.

(21) Appl. No.: 13/171,248

(22) Filed: Jun. 28, 2011

(65) Prior Publication Data
US 2011/0253006 A1 Oct. 20, 2011

Related U.S. Application Data

(63) Continuation of application No. PCT/CN2010/073251, filed on May 26, 2010.

(30) Foreign Application Priority Data
Apr. 2, 2010 (CN) .......................... 2010 2 0153157

(51) Int. Cl.
*B61D 17/00* (2006.01)

(52) U.S. Cl.
USPC ....................................... 105/406.1; 105/409

(58) Field of Classification Search
USPC .............. 105/396, 397, 399, 404, 406.1, 407, 105/409, 411
See application file for complete search history.

(56) References Cited

U.S. PATENT DOCUMENTS

| 2,033,566 | A | | 3/1936 | Wine .............................. 105/406 |
| 3,789,773 | A | * | 2/1974 | McNally et al. ............... 105/248 |
| 4,930,427 | A | * | 6/1990 | Ritter et al. ................. 105/406.1 |
| 6,302,031 | B1 | * | 10/2001 | Smith et al. ..................... 105/404 |
| 2007/0101895 | A1 | * | 5/2007 | Forbes et al. .............. 105/406.1 |
| 2007/0101896 | A1 | * | 5/2007 | Forbes et al. .............. 105/406.1 |
| 2009/0031919 | A1 | * | 2/2009 | Forbes et al. .............. 105/406.1 |
| 2009/0211485 | A1 | * | 8/2009 | Cummings ................ 105/406.1 |
| 2010/0006000 | A1 | * | 1/2010 | Forbes et al. .............. 105/406.1 |

(Continued)

OTHER PUBLICATIONS

Canadian Examination Report of Canadian Application No. 2,746,883, dated Nov. 28, 2012.

*Primary Examiner* — Jason C Smith
(74) *Attorney, Agent, or Firm* — J.C. Patents

(57) ABSTRACT

The present invention provides a side wall of railway wagon and a boxcar of railway wagon. The side wall of the railway wagon comprises an upper side plate, a lower side plate, an inner side stake and an outer side stake, wherein the said inner side stake is arranged at the inner side of the said upper side plate and the said lower side plate, and the said outer side stake is arranged at the upper part of the said side wall of railway wagon and is arranged at the outer side of the said upper side plate. By applying the side wall in the form of internal stakes, the side wall of railway wagon and the boxcar of railway wagon of the present invention can make full use of the width space between the outer surface of the side plate and the outer surface of the side stake on the basis that the external dimension of the railway wagon is not changed, thereby effectively improving the volume of the railway wagon and the transporting capability of the train.

9 Claims, 3 Drawing Sheets

U.S. PATENT DOCUMENTS

2010/0011987 A1*  1/2010  Forbes .................... 105/406.1
2010/0089283 A1*  4/2010  Kono et al. ................. 105/397
2010/0275812 A1*  11/2010 Forbes et al. ............ 105/406.1
2011/0017095 A1*  1/2011  Forbes et al. ............ 105/406.1
2011/0253006 A1*  10/2011 Han et al. ................... 105/409

* cited by examiner

SIDE WALL AND BOXCAR OF RAILWAY WAGON

CROSS-REFERENCE TO RELATED APPLICATIONS

This application is a continuation of International Application No. PCT/CN2010/073251, filed on May 26, 2010, which claims the priority benefit of the China Patent Application No. 201020153157.5, filed on Apr. 2, 2010. The contents of the above identified applications are incorporated herein by reference in their entirety.

FIELD OF THE TECHNOLOGY

The present invention relates to a structure of transportation equipment, and particularly to a side wall of railway wagon and a boxcar of railway wagon.

BACKGROUND

The body of a boxcar of a railway wagon mainly consists of an underframe, a front end wall, a back end wall, a left side wall and a right side wall, wherein the volume of the boxcar of railway wagon is an important structural parameter, which is directly related to the quantity of the goods loaded by the railway wagon. When the structure of a railway wagon is designed, the maximization of the cross-section area of the boxcar is always pursued by the designer, so as to improve the volume of the boxcar; However, as being limited by the boundary of the railway wagon, the size of the railway wagon, such as length, width and the like, can not be optionally enlarged so that the structure of the side wall becomes the key factor to the volume of the boxcar.

The existing side wall of a railway wagon is in a plate-stake structure which is assembled by welding side plates and side stakes, and the side stakes are generally in the form of external stakes in a straight wall structure. FIG. 1 is the structural schematic diagram of the perspective view of the side wall of a railway wagon in the prior art, and FIG. 2 is the structural schematic diagram of the side view of the side wall of a railway wagon in the prior art. As shown in the FIG. 1 and FIG. 2, the side wall of the railway wagon mainly comprises side plate 11 and side stakes 12, wherein the side plate 11 is generally assembled by welding a plurality of side wall plates, such as steel plates about 5 mm thick. A plurality of the side stakes are arranged at the outer side of the side plate 11 at intervals, and one side wall plate is arranged between every two side stakes. Furthermore, upper side beam 13 is further welded above the side plate 11 and the side stake 12, and cross bearer 14 is lengthways arranged in the middle of the side plate 11.

The inventor discovers that there exist at least the following problems in the prior art: as shown in FIG. 2, in the structure of the side wall in the form of external stakes, a width space A is formed between the outer surface of the side plate 11 and the outer surface of the side stake 12, which is generally about 100 mm wide and is not used for transporting goods as the volume of the boxcar, leading to the waste of the volume of the boxcar.

SUMMARY

The object of the embodiments of the present invention is to provide a side wall of a railway wagon and a boxcar of railway wagon, so as to solve the problem of the waste of the width space between the outer surface of the side plate and the outer surface of the side stakes in the prior art, make full and effective use of the width space, and improve the volume of the boxcar.

The embodiments of the present invention provide a side wall of a railway wagon, comprising an upper side plate, a lower side plate, an inner side stake and a outer side stake which are connected in a welding way; wherein the inner side stake is arranged at the inner side of the upper side plate and the lower side plate, and the outer side stake is arranged at the upper part of the side wall of the railway wagon and is arranged at the outer side of the upper side plate. By the above structure, the width space between the outer surface of the side plate and the outer surface of the side stake can be fully used on the basis that the external dimension of the railway wagon is not changed, thereby effectively improving the volume of the railway wagon.

On that basis, the upper side plate can be in a folded plate structure. The application of the folded plate structure can improve the transverse rigidity of the upper part of the side wall and the flatness of the side plate, so that the cross bearer of the side plate is unnecessary and can be removed, thereby reducing the self weight of the railway wagon.

On that basis, the upper side plate can be in an integrated structure of upper side beam and upper side plate. By the structure, the weld joint between the upper side beam and the side plate can be eliminated, thereby improving the reliability of the railway wagon.

On that basis, the cross section of the inner side stake at the lower part of the side wall of the railway wagon can be larger, and the cross section of the inner side stake at the upper part of the side wall of the railway wagon can be smaller. By the structure, the bending strength of the side stake can be improved.

On that basis, the upper side plate can be in a continuous structure, and be a one-piece side wall plate at the upper part of the side wall of the railway wagon.

On that basis, the lower side plate can be in a profiling structure and be connected with the inner side stake by a connecting plate. By the profiling structure, the transverse rigidity of the lower part of the side wall and the flatness of the side plate can be improved on the premise that the side plate is not additionally provided with the cross bearer.

The embodiments of the invention provide a boxcar of a railway wagon, comprising an underframe, end walls arranged at the front end and the back end of the boxcar of the railway wagon, further comprising the above side walls of the railway wagon, wherein the side walls of the railway wagon are arranged at the left side and right side of the boxcar of the railway wagon.

By applying the side wall in the form of internal stakes structure, the side wall of the railway wagon and the boxcar of the railway wagon provided by the embodiments of the present invention can make full use of the width space between the outer surface of the side plate and the outer surface of the side stake on the basis that the external dimension of the railway wagon is not changed, thereby effectively improving the volume of the railway wagon and the transporting capability of the train.

BRIEF DESCRIPTION OF THE DRAWINGS

In order to describe the technical solutions of the embodiments of the present invention more clearly, the figures used in the description of the embodiments or the prior art are be introduced briefly as follows. Obviously, the figures mentioned in the following description are to exemplarily show embodiments of the present invention, and according to those figures, other variations can be obtained by those skilled in the art on the premise of no creative work.

Marks of Drawings

| 11-side plate; | 12-side stake; | 13-upper side beam |
| 14-cross bearer; | 21-upper side plate; | 22-lower side plate; |
| 23-outer side stake; | 24-inner side stake; | 25-connecting plate. |

DETAILED DESCRIPTION

In order to make the object, technical solutions and merits of the embodiments of the present invention clearer, the technical solutions of the embodiments of the present invention will be clearly and integrally described by reference to the accompanying drawings of the embodiments of the present invention. Obviously, the described embodiments are only part of the present invention rather than covering the whole scope of the invention. Based on the embodiments of the present invention, all the other variations and modifications obtained by those skilled in the art according to the teachings of the present invention and on the premise of no creative work are covered in the protection scope of the present invention.

Figure 2:
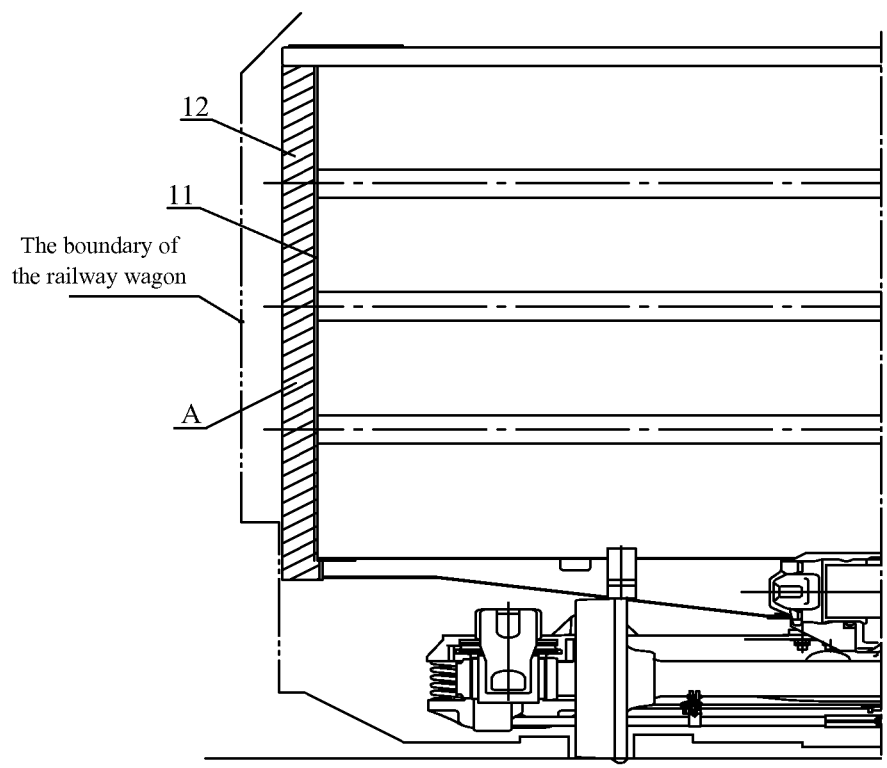
FIG. 2 is the structural schematic diagram of the side view of the side wall of a railway wagon in the prior art.

The main technical solution of the embodiments of the present invention is as follows: the side wall in the form of external stakes in the prior art is changed to the side wall of the inner-side-staked structure, and the inner-side-staked side wall comprises an upper side plate, a lower side plate, an inner side stake and an outer side stake which are connected in a welding way, wherein the inner side stake is arranged at the inner side of the upper side plate and the lower side plate, and the outer side stake is arranged at the outer side of the upper side plate. By the structure, the width space A shown in FIG. 2 can be fully and efficiently used, thereby effectively improving the volume of the railway wagon on the basis that the external dimension of the railway wagon is not changed. A further detailed description of technical solutions of the present invention is given by reference to the accompanying drawings and the embodiments.

Figure 3:
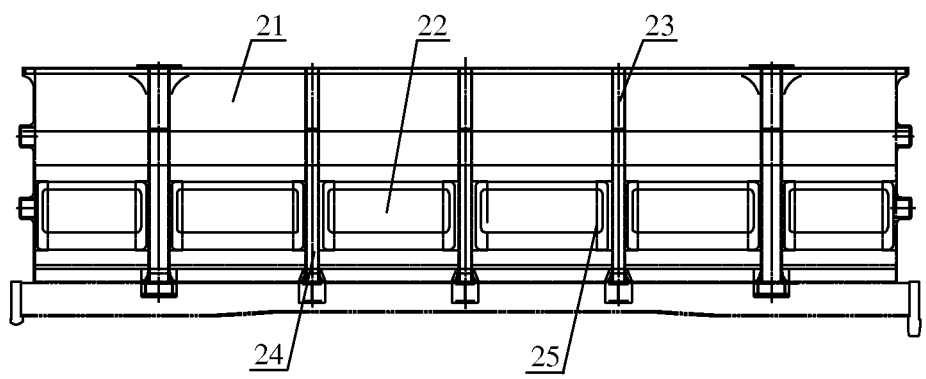
FIG. 3 is the structural schematic diagram of the side wall of a railway wagon provided by the embodiments of the present invention.
Figure 4:
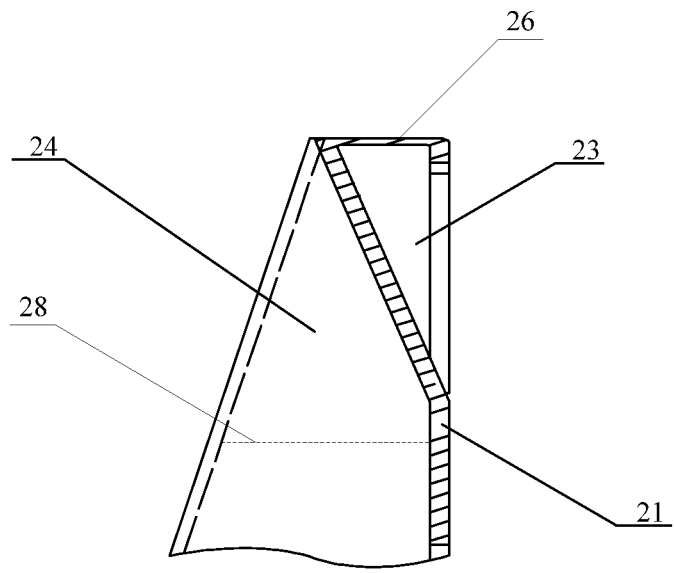
FIG. 4 is the structural schematic diagram of the upper part of the side wall of the railway wagon as shown in FIG. 3.
Figure 5:
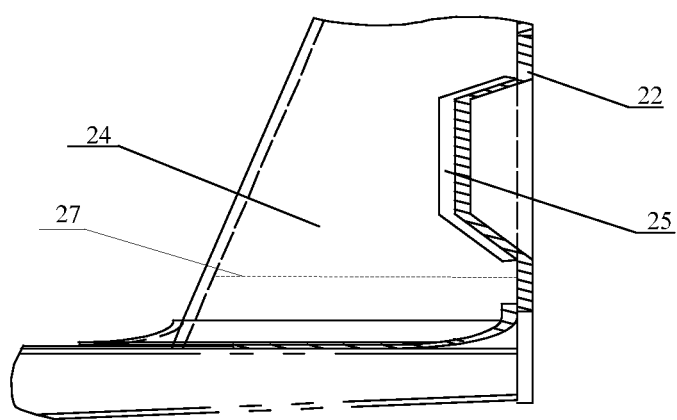
FIG. 5 is the structural schematic diagram of the lower part of the side wall of the railway wagon as shown in FIG. 3.

FIG. 3 is the structural schematic diagram of the side wall of a railway wagon provided by the embodiments of the present invention, FIG. 4 is the structural schematic diagram of the upper part of the side wall of the railway wagon as shown in FIG. 3, and FIG. 5 is the structural schematic diagram of the lower part of the side wall of the railway wagon as shown in FIG. 3. A description of the structure of the side wall of the railway wagon provided by the embodiments of the present invention is given by reference to FIG. 3, FIG. 4 and FIG. 5. The side wall comprises upper side plate 21, lower side plate 22, outer side stake 23 and inner side stake 24.

Figure 1:
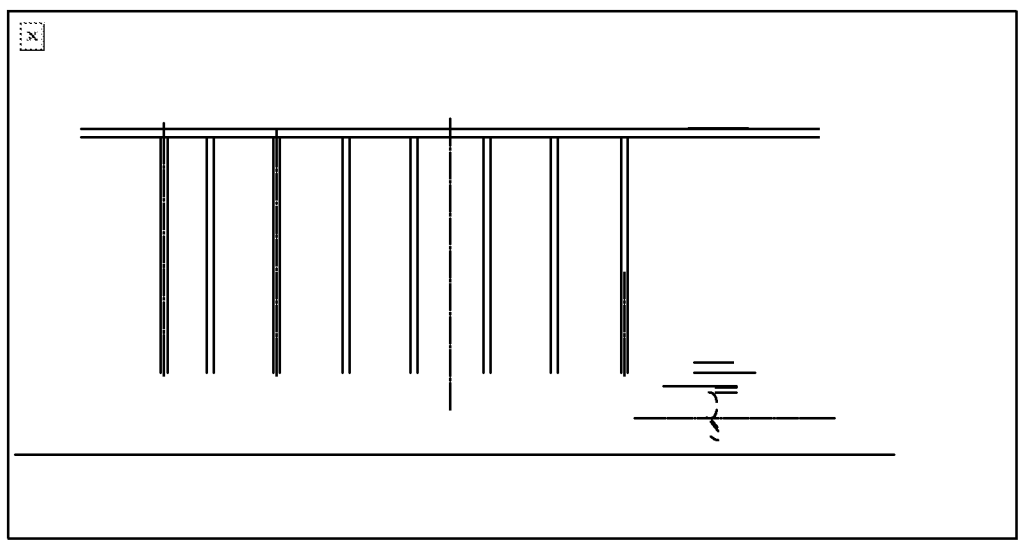
FIG. 1 is the structural schematic diagram of the perspective view of the side wall of a railway wagon in the prior art.

Furthermore, the application of the structure of the upper side plate 21 as shown in FIG. 4 make the structure correspond to an integrated structure of upper side beam 26 and upper side plate, so that the upper side beam 13 does not need to be additionally and independently arranged as shown in FIG. 1, thereby eliminating the weld joint between the upper side beam 13 and the side plate 11 in the structure shown in FIG. 1 and improving the reliability of the railway wagon.

At the upper part of the side wall, the upper side plate 21 is arranged between the outer side stake 23 and the inner side stake 24, the upper side plate 21 separates the outer side stake 23 from the inner side stake 24 and is welded with the outer side stake 23 and the inner side stake 24. The outer side stake 23 is only arranged at the upper part of the side wall, only the inner side stake 24 is arranged at the lower part of the side wall, and the inner side stake 24 is arranged at the inner side of the lower side plate 22. As shown in FIG. 5, the inner side stake 24 at the lower part of the side wall of railway wagon is wider, i.e. the first cross-section 27 area is larger, and the inner side stake 24 at the upper part of the side wall of railway wagon is narrower, i.e. the second cross-section 28 area is smaller. The structure can improve the bending strength of the side stake. Wherein, the inner side stake 24 and the outer side stake 23 comprise so-called side stake and bolster sill.

At the upper part of the side wall, the upper side plate 21 is arranged between the outer side stake 23 and the inner side stake 24, the upper side plate 21 separates the outer side stake 23 from the inner side stake 24 and is welded with the outer side stake 23 and the inner side stake 24. The outer side stake 23 is only arranged at the upper part of the side wall, only the inner side stake 24 is arranged at the lower part of the side wall, and the inner side stake 24 is arranged at the inner side of the lower side plate 22. As shown in FIG. 5, the inner side stake 24 at the lower part of the side wall of railway wagon is wider, i.e. the cross-section area is larger, and the inner side stake 24 at the upper part of the side wall of railway wagon is narrower, i.e. the cross-section area is smaller. The structure can improve the bending strength of the side stake. Wherein, the inner side stake 24 and the outer side stake 23 comprise so-called side stake and bolster sill.

On that basis, the upper side plate 21 can be in a continuous structure, i.e. the upper side plate 21 can be a one-piece side wall plate at the upper part of the side wall, unlike the side plate 11 in the prior art as shown in FIG. 1, which is assembled by welding a plurality of side wall plates.

At the lower part of the side wall, the lower side plate 22 can be in a profiling structure. By the profiling structure, the transverse rigidity of the lower part of the side wall and the flatness of the lower side plate 22 can be improved, and the bending rigidity of the lower side plate 22 can be increased on the premise that the side plate is not additionally provided with the cross bearer.

Particularly, the lower side plate 22 can be in a profiling structure formed by a plurality of pieces, for example, one piece of the lower side plate 22 is arranged between every two inner side stakes 24. Here, the lower side plate 22 is formed with a longitudinal recess along the length direction of the railway wagon, the recess can be formed by press molding or other method known in the art and may have a rectangular or U shaped cross section. The structure with the recess can increase the bending rigidity of the lower side plate 22. However, a weak region can be formed along the direction perpendicular to the length direction of the railway wagon. Therefore, the lower side plate 22 can be connected with the side stakes 24 arranged at the two sides thereof by a connecting plate 25, and the connecting plate 25 can play a reinforcing part here.

Furthermore, the lower side plate 22 also can be formed by a single piece of plate via press molding, i.e. press-molded to a plate with a longitudinal recess of a U-shaped cross section as shown in FIG. 5, and by the structure with the longitudinal recess of the U-shaped cross section, the bending strength of the lower side plate 22 can also be increased; however, due to the one-piece lower side plate structure here, no weak region is formed locally, so that the connecting plate does not need to be arranged for reinforcing; and a nick corresponding the recess can be arranged in the inner side stake and the nick can be used as a connecting port for connecting with the one-piece lower side plate 22.

By applying the structure of internal stakes, the side wall of railway wagon of the embodiments can make full use of the width space between the outer surface of the side plate and the outer surface of the side stake on the basis that the external dimension of the railway wagon is not changed, thereby effectively improving the volume of the railway wagon and the transporting capability of the train; and by applying the folded-plated upper side plate and the lower side plate in the profiling structure, the transverse rigidity of the side wall and the flatness of the side plate are improved, the weight of the railway wagon is reduced, the reliability of the railway wagon is improved, and the maintenance cost of the railway wagon is reduced, so that the application of the structure of the side wall of railway wagon can bring the considerable economic benefit and social effect to the society.

Furthermore, based on the above embodiments of the side wall of railway wagon, the embodiments of the present invention further provide a boxcar of railway wagon comprising the side walls of railway wagon in the above structure, wherein the boxcar of railway wagon further comprises an underframe, a front end wall and a back end wall, and the side walls are arranged at the left side and right side of the boxcar of railway wagon.

Compared with the boxcar in the prior art, due to applying the side wall of railway wagon of the above embodiments, the boxcar of railway wagon also obviously improves the volume of the railway wagon and the transporting capability of the train, reduces the weight of the railway wagon, improves the reliability of the railway wagon, and reduces the maintenance cost of the railway wagon.

Finally, it should be understood that the above embodiments are only used to explain, but not to limit the technical solutions of the present invention. In despite of the detailed description of the present invention with referring to the above embodiments, it should be understood that various modifications, changes or equivalent replacements of the above embodiments can be made by those skilled in the art without departing from the scope of the embodiments of the present invention and covered in the claims of the present invention.

The invention claimed is:

1. A side wall of railway wagon, characterized in that: the side wall comprises an upper side plate, a lower side plate, an inner side stake and an outer side stake, wherein; the inner side stake is arranged at the inner side of the upper side plate and the lower side plate, and the outer side stake is arranged at the upper part of the side wall and is arranged at the outer side of the upper side plate;

the upper side plate comprises a lower vertical portion and an upper bending portion inclined inwardly;

an outer surface of the lower vertical portion and an outer surface of the lower side plate are coplanar forming a vertical plane, and the outer side stake is mounted on the upper bending portion and no part of the outer side stake exceeds the vertical plane outwardly.

2. The side wall of railway wagon of claim 1, characterized in that: the upper side plate, the lower side plate, the inner side stake and the outer side stake are connected in a welding way.

3. The side wall of railway wagon of claim 1, characterized in that: the upper side plate is in an integrated structure of upper side beam and upper side plate.

4. The side wall of railway wagon of claim 1, characterized in that: a first cross section of the inner side stake at the lower part of the side wall is larger and a second cross section of the inner side stake at the upper part of the side wall is smaller.

5. The side wall of railway wagon of claim 1, characterized in that: the upper side plate is in a continuous structure, and which at the upper part of the side wall is a one-piece side wall plate.

6. The side wall of railway wagon of claim 1, characterized in that: the lower side plate is in a profiling structure formed by a plurality of pieces, and is connected with the inner side stake by a connecting plate.

7. The side wall of railway wagon of claim 6, characterized in that: the lower side plate is in an integrated profiling structure with a longitudinal recess of a U-shaped cross section; and a connecting port is arranged in the inner side stake, by which the inner side stake is connected with the lower side plate.

8. A boxcar of railway wagon, comprising an underframe and end walls arranged at the front end and back end of the said boxcar of railway wagon, characterized by further comprising the side walls of railway wagon described in any one of claims 1-7, wherein the side walls of railway wagon are arranged at the left side and right side of the boxcar of railway wagon.

9. The side wall of railway wagon of claim 1, characterized in that: an outer vertical surface of the outer side stake and the outer surface of the lower vertical portion are coplanar.

* * * * *